United States Patent [19]

Machiguchi

[11] Patent Number: 5,772,504
[45] Date of Patent: Jun. 30, 1998

[54] DRIVING GAME MACHINE

[75] Inventor: Hiroyasu Machiguchi, Kobe, Japan

[73] Assignee: Konami Co., Ltd., Hyogo-ken, Japan

[21] Appl. No.: 711,824

[22] Filed: Sep. 10, 1996

[30] Foreign Application Priority Data

Sep. 12, 1995 [JP] Japan ................................. 7-233908

[51] Int. Cl.$^6$ ...................................................... A63F 9/14
[52] U.S. Cl. ............................................................. 463/6
[58] Field of Search ............................ 463/6, 7, 23, 30, 463/32, 33, 34, 36, 38; 434/62, 69, 71

[56] References Cited

U.S. PATENT DOCUMENTS

| | | | |
|---|---|---|---|
| 5,368,484 | 11/1994 | Copperman et al. | 463/30 |
| 5,618,179 | 4/1997 | Copperman et al. | 434/69 |
| 5,704,837 | 1/1998 | Iwasaki et al. | 463/38 |

Primary Examiner—George Manuel
Attorney, Agent, or Firm—Jordan and Hamburg

[57] ABSTRACT

A course coordinate system processor has a general automobile control unit, a movement decision unit, and a position decision unit. The general automobile control unit controls the running of a plurality of general automobiles on a straight road in a course coordinate system. The movement decision unit determines whether or not another automobile exists in front of an automobile which is under consideration for a movement decision. The position decision unit determines the positional relation between a player's automobile and general automobiles in the course coordinate system, and also determines general automobiles that are positioned in a predetermined visible range of the player's automobile. Positional coordinate data of the player's automobile have been transformed from a world coordinate system into the course coordinate system by a course coordinate system transformation unit.

5 Claims, 8 Drawing Sheets

DRIVING GAME MACHINE

BACKGROUND OF THE INVENTION

1. Field of the Invention

The present invention relates to a driving game machine which is played by the player to simulate the driving of an automobile and which displays on a display monitor a three-dimensional image that varies depending on the manner in which the simulated automobile is driven by the player.

2. Description of the Related Art

There have been in widespread use driving game machines that are played by the player who is seated in a cockpit equipped with a steering wheel, an accelerator pedal, a brake pedal, etc., similar to the driver's seat of an actual automobile. While seeing a three-dimensional image displayed on a display monitor, the player operates the steering wheel, the accelerator pedal, the brake pedal, etc. to drive a simulated automobile on the display monitor. The display monitor displays, on a displayed road, the automobile driven by the player, a rival automobile or automobiles competing for a driving game, and general automobiles existing as obstacles. The automobile driven by the player will be referred to as the player's automobile, and the rival and general automobiles as other automobiles.

In a driving game played on the driving game machine, it is necessary to display when the player's automobile collides with another automobile, and the other automobiles are required to understand their positional relation to each other and move based on that understanding. Consequently, the positional relation between the player's automobile and the other automobiles and also between the other automobiles has to be determined each time the image displayed on the display monitor is refreshed. The positional relation between those displayed automobiles can relatively easily be determined if the displayed road along which the automobiles runs is flat and straight.

Usually, however, the displayed road is a three-dimensional road which has curves and ups and downs, because the player would lose interest in the flat and straight road in the driving game. The positional relation between the displayed automobiles on such a three-dimensional road has to be determined after the displayed positions of the player's and other automobiles are calculated in a three-dimensional coordinate system. Therefore, it will take a long period of time to determine the positional relation between the displayed automobiles on the three-dimensional road. It is laborious and time-consuming to produce a program which is capable of determining the positional relation on a real-time basis each time the displayed image is refreshed, resulting in a reduction in the efficiency of development of driving game machines.

SUMMARY OF THE INVENTION

It is therefore an object of the present invention to provide a driving game machine which is capable of quickly and easily determining the positional relation between the player's and other automobiles on a real-time basis.

According to the present invention, there is provided a driving game machine comprising three-dimensional data memory means for storing coordinate data of a three-dimensional road established in a game space in a three-dimensional coordinate system, two-dimensional data memory means for storing coordinate data of a straight road established in a two-dimensional coordinate system in association with the three-dimensional road, player's automobile control means for controlling a player's automobile on the three-dimensional road as instructed by a player, general automobile control means for controlling general automobiles on the straight road, two-dimensional coordinate transforming means for transforming coordinate data of the player's automobile on the three-dimensional road into coordinate data on the straight road in the two-dimensional coordinate system, and position deciding means for determining the positional relation between the player's automobile and the general automobiles based on the coordinate data on the straight road in the two-dimensional coordinate system.

The position deciding means comprises means for determining general automobiles which are positioned in a predetermined visible range of the player's automobile, and the driving game machine further comprises three-dimensional coordinate transforming means for transforming coordinate data of the general automobiles which are determined as being positioned in the predetermined visible range into coordinate data on the three-dimensional road in the three-dimensional coordinate system, and image display processing means for displaying the player's automobile and the general automobiles whose coordinate data have been transformed into the coordinate data on the three-dimensional road in the three-dimensional coordinate system, on a display monitor according to three-dimensional image processing.

The driving game machine further comprises rival automobile control means for controlling a rival automobile on the three-dimensional road as instructed by a competing player. The two-dimensional coordinate transforming means further comprises means for transforming coordinate data of the rival automobile on the three-dimensional road into coordinate data on the straight road in the two-dimensional coordinate system, and the position deciding means comprises means for determining the positional relation between the player's automobile and the rival automobile based on the coordinate data on the straight road in the two-dimensional coordinate system.

According to the present invention, there is also provided a driving game machine comprising player's automobile control means for controlling a player's automobile on a three-dimensional road in a game space in a three-dimensional coordinate system as instructed by a player, general automobile control means for controlling general automobiles on a straight road in a two-dimensional coordinate system, which is converted from the three-dimensional road, two-dimensional coordinate transforming means for transforming coordinate data of the player's automobile on the three-dimensional road into coordinate data on the straight road in the two-dimensional coordinate system, position deciding means for determining the positional relation between the player's automobile and the general automobiles based on the coordinate data on the straight road in the two-dimensional coordinate system, and determining general automobiles which are positioned in a predetermined visible range of the player's automobile, three-dimensional coordinate transforming means for transforming coordinate data of the general automobiles which are determined as being positioned in the predetermined visible range into coordinate data on the three-dimensional road in the three-dimensional coordinate system, and image display processing means for displaying the player's automobile and the general automobiles whose coordinate data have been transformed into the coordinate data on the three-dimensional road in the image space in the three-dimensional coordinate system. The driving game machine further comprises rival automobile control means for controlling a rival automobile on the three-dimensional road as instructed by a competing player, wherein the two-dimensional coordinate transforming means further comprises means for transforming coordinate data of the rival automobile on the three-dimensional road into coordinate data on the straight road in the two-dimensional coordinate system, and the position deciding means comprises means for determining the positional relation between the player's automobile and the rival automobile based on the coordinate data on the straight road in the two-dimensional coordinate system.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
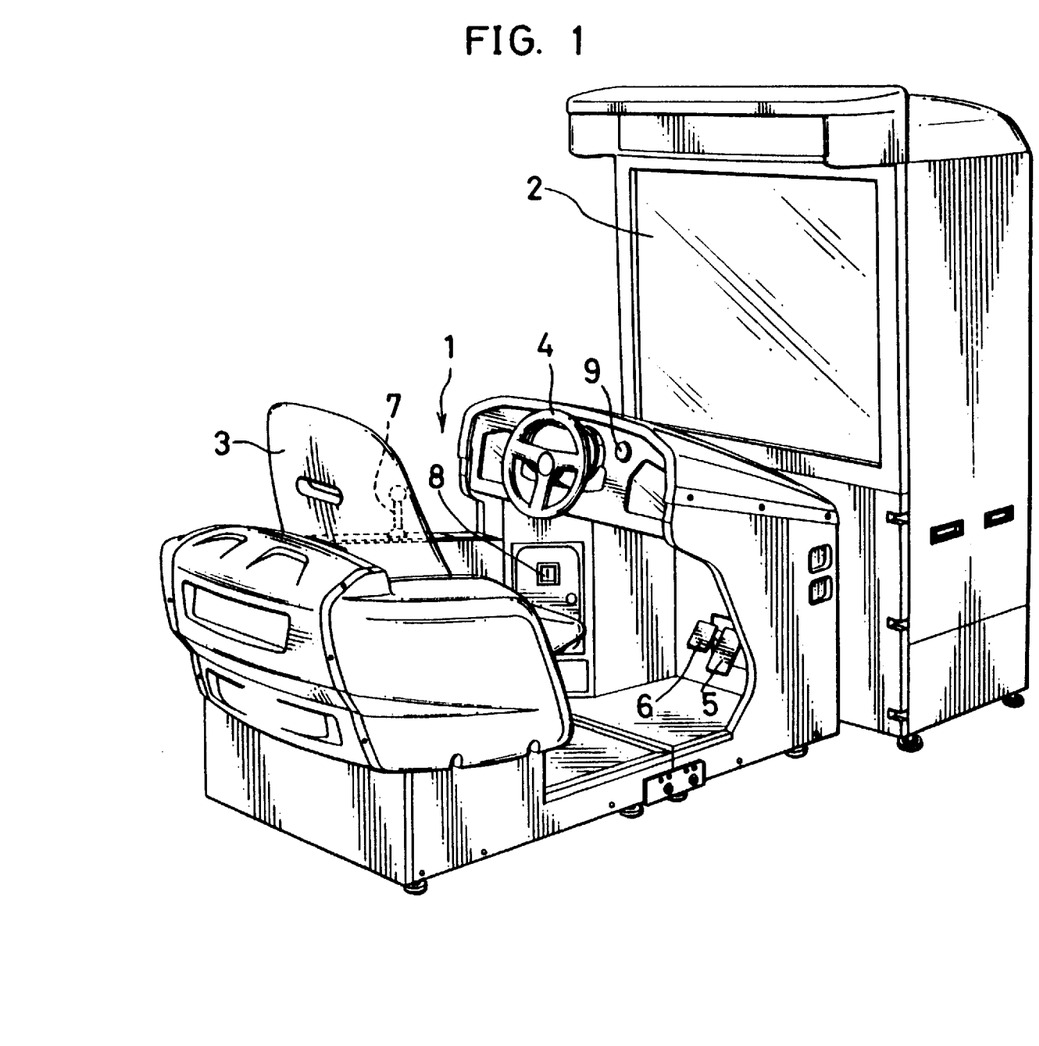
FIG. 1 is a perspective view of a driving game machine according to the present invention.

As shown in FIG. 1, a driving game machine according to the present invention generally comprises a cockpit 1 and a display monitor 2. The cockpit 1 has a driver's seat 3, a steering wheel 4, an accelerator pedal 5, a brake pedal 6, and a gear change lever 7, similar to the driver's seat of an actual automobile. The cockpit 1 also has a coin insertion slot 8 for inserting a coin therethrough, positioned in front of the left-hand side of the driver's seat 3, and a start switch 9 positioned on the right-hand side of the steering wheel 4. The display monitor 2 is located in front of the cockpit 1 at a position that can easily be viewed by the player who is seated on the driver's seat 3. The display monitor 2 may comprise a CRT (cathode-ray tube), an LCD (liquid crystal display), a projector, or the like for displaying images thereon.

Coordinate systems used in an image processing process for a driving game played on the driving game machine and a summary of such a driving game will be described below with reference to FIGS. 2 through 4.

Figure 2:
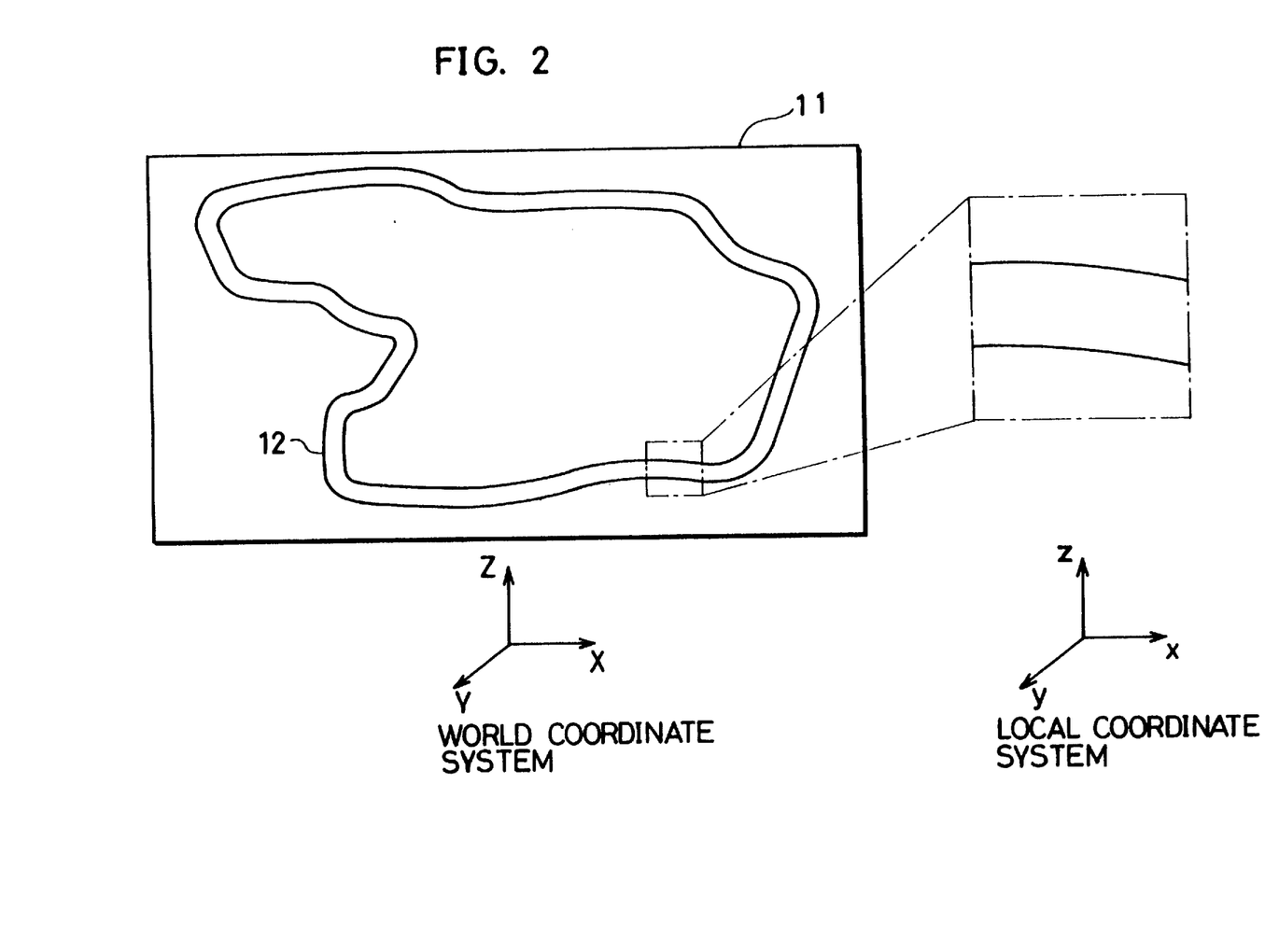
FIG. 2 is a diagram showing a field of a driving game played on the driving game machine.

FIG. 2 schematically shows a field 11 of a driving game played on the driving game machine. The field 11 shown in FIG. 2 represents an entire space that is expressed by a computer graphic image, and includes a circuit road 12 extending substantially along peripheral edges of the field 11 and models (not shown) of buildings and other objects placed along the circuit road 12. FIG. 3 fragmentarily shows the circuit road 12. As shown in FIG. 3, the circuit road 12 has a start point and is divided into road models ①, ②, ③, ④, ⑤, ⑥ spaced by respective distances from the start point. Each of the road models ①, ②, ③, ④, ⑤, ⑥ is an individual object that is displayed as a computer graphic image.

FIG. 2 also shows a three-dimensional world coordinate system (X, Y, Z) which is established in the field 11 in its entirety, and a three-dimensional local coordinate system (x, y, z) which is established in a partial space in the field 11. Each of the road models ①, ②, ③, ④, ⑤, ⑥ and the models of buildings and other objects is described using its own inherent local coordinate system (x, y, z).

Figure 4:
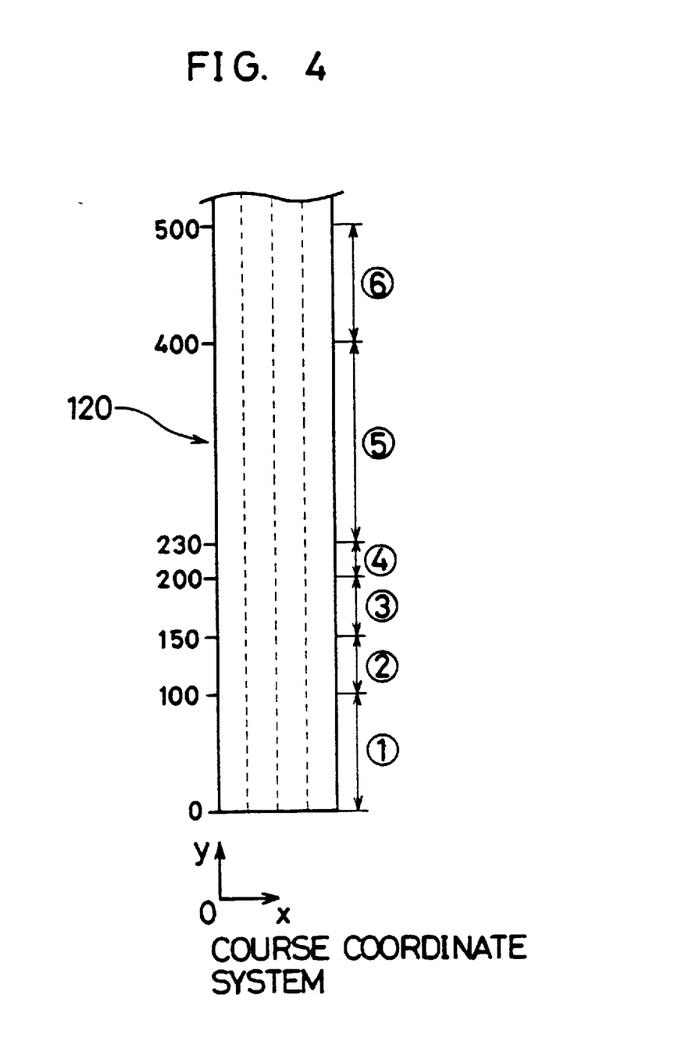
FIG. 4 is a diagram showing a hypothetical straight road that is converted from the circuit road along a center line thereof.

FIG. 4 illustrates a hypothetical straight road 120 that is converted from the circuit road 12 along a center line thereof. A two-dimensional course coordinate system (x, y) shown in FIG. 4 is established on the straight road 120. The two-dimensional course coordinate system (x, y) has y coordinates which represent distances along the straight road 120 from the start point, and x coordinates which represent transverse positions across the straight road 120. As shown in FIG. 4, the straight road 120, i.e., the circuit road 12, has four lanes.

In a driving game played on the driving game machine by the player sitting in the cockpit 1, the player controls the steering wheel 4, the accelerator pedal 5, the brake pedal 6, and the gear change lever 7, trying to drive the player's automobile displayed on the display monitor 2 while passing general automobiles displayed on the display monitor 2, on the circuit road 12. The general automobiles running on the circuit road 12 are controlled by the driving game machine. There are several tens of general automobiles established by the driving game machine. Depending on the position and direction of the player's automobile, the models of buildings and other objects along the circuit road 12 and the general automobiles, which are positioned within a visible range, are displayed on the display monitor 2.

Figure 5:
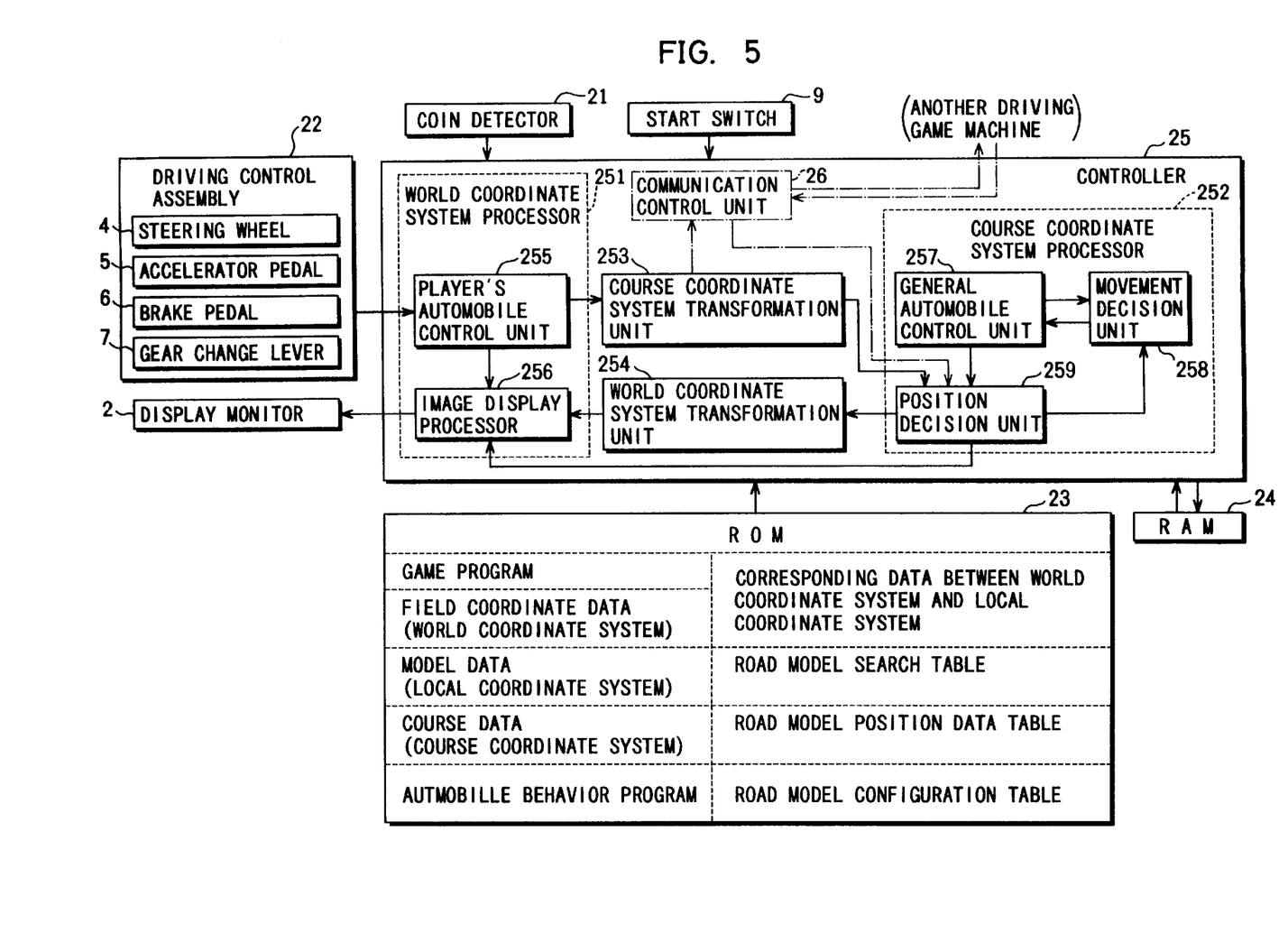
FIG. 5 is a block diagram of a control system of the driving game machine.

FIG. 5 shows in block form a control system of the driving game machine according to the present invention.

As shown in FIG. 5, the control system basically comprises the display monitor 2, the start switch 9, a coin detector 21, a driving control assembly 22, a ROM (read-only memory) 23, a RAM (read-only memory) 24, and a controller 25.

When the start switch 9 is pressed by the player, the start switch 9 issues a switch signal to the controller 25. When the coin detector 21 detects a coin inserted through the coin insertion slot 8, it outputs a coin-detected signal to the controller 25.

The driving control assembly 22 comprises the steering wheel 4, the accelerator pedal 5, the brake pedal 6, and the gear change lever 7. The driving control assembly 22 supplies various control data, representing an angular displacement of the steering wheel 4, depths to which the accelerator pedal 5 and the brake pedal 6 are depressed, and a gear position selected by the gear change lever 7, to the controller 25 where they are inputted to a player's automobile control unit 255 (described later on).

The ROM 23 stores a program of the driving game, coordinate data of the field in the world coordinate system (X, Y, Z), coordinate data of the models in the local coordinate system (x, y, z), course data in the course coordinate system (x, y), a program relative to automobile behaviors according to the automobile engineering, data indicative of the correspondence between the world coordinate system (X, Y, Z) and the local coordinate system (x, y, z), and table data shown in Tables 1 through 3, described below. The RAM 24 serves to temporarily store various data.

The controller 25 comprises a CPU (central processing unit), logic circuits, and other circuit elements for controlling operation of the driving game machine. The controller 25 determines whether a coin is inserted into the coin insertion slot 8 or not based on the signal from the coin detector 21, and also determines whether the start switch 9 is pressed by the player or not based on the signal from the start switch 9.

The controller 25 has a world coordinate system processor 251, a course coordinate system processor 252, a course coordinate system transformation unit 253, and a world coordinate system transformation unit 254.

The world coordinate system processor 251, which carries out control in the world coordinate system (X, Y, Z), has a player's automobile control unit 255 and an image display processor 256. The course coordinate system processor 252, which carries out control in the local coordinate system (x, y, z), has a general automobile control unit 257, a movement decision unit 258, and a position decision unit 259.

The player's automobile control unit 255 controls the running of the player's automobile based on the various control data supplied from the driving control assembly 22 according to the program, stored in the ROM 23, relative to automobile behaviors according to the automobile engineering. The course coordinate system transformation unit 253 transforms the coordinate data relative to the position of the player's automobile that is being controlled in the world coordinate system (X, Y, Z) into coordinate data in the course coordinate system (x, y).

The general automobile control unit 257 controls the running of the general automobiles on the straight road 120 (see FIG. 4) in the course coordinate system (x, y) under preset conditions with respect to speeds, lane change frequencies, etc.

Since y coordinates in the course coordinate system (x, y) represent distances traveled by the general automobiles along the straight load 120, the general automobile control unit 257 can easily determine the positions of the general automobiles by adding the product of (sampling interval)×(running speed) to the present y coordinates. In addition, since y coordinates in the course coordinate system (x, y) represent transverse positions of the general automobiles across the straight road 120, the general automobile control unit 257 can easily determine distances that the general automobiles have traveled transversely across the straight road 120 such as for lane changes, by adding or subtracting the product of (sampling interval)×(transversely moving speed) to or from the present x coordinates.

The position decision unit 259 determines the positional-relation between the player's automobile and the general automobiles for a contact, a collision, etc., and the positional relation between the general automobiles, and also determines general automobiles which are positioned in a predetermined visible range of the player's automobile. The position decision unit 259 uses the coordinate data transformed by the course coordinate system transformation unit 253 as the positional coordinate data of the player's automobile. The predetermined visible range of the player's automobile has been defined by left and right angles with respect to the direction in which the player's automobile travels, and a distance from the player's automobile.

When the position decision unit 259 determines a contact or collision with a general automobile, it delivers a collision signal to the image display processor 256.

Figure 6:
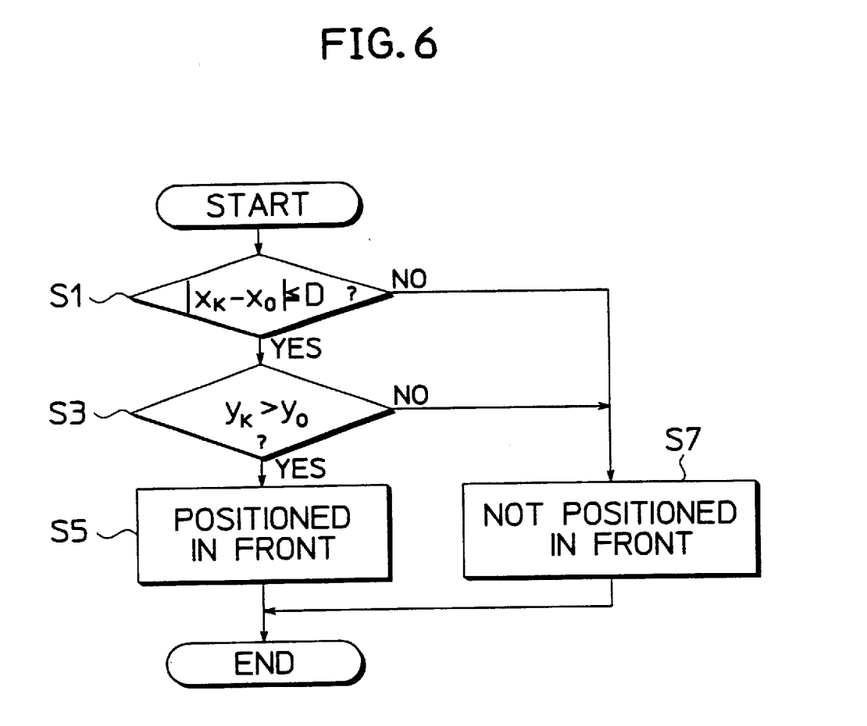
FIG. 6 is a flowchart of a sequence of making a movement decision.

The movement decision unit 258 determines whether the player's automobile or another general automobile exists in front of a general automobile which is under consideration for a movement decision, according to a process shown in FIG. 6, using the positional relation determined between the player's automobile and the general automobiles and also the positional relation between the general automobiles by the position decision unit 259. The results determined by the movement decision unit 258 are used by the general automobile control unit 257 to control the running of the general automobiles. The movement decision unit 258 may also determine whether there is an automobile existing in an adjacent lane or not for thereby determining whether the general automobile which is under consideration for a movement decision can change lanes or not.

The world coordinate system transformation unit 254 transforms the positional coordinate data of general automobiles that are determined to be positioned in the visible range of the player's automobile by the position decision unit 259, from the course coordinate system (x, y) into the world coordinate system (X, Y, Z).

The image display processor 256 displays the circuit road 12 (see FIG. 2) in the visible range of the player's automobile, the models of the buildings and other objects along the circuit road 12, and the general automobiles whose positional coordinate data have been transformed into the world coordinate system (X, Y, Z), on the display monitor 2 according to known three-dimensional image processing techniques including geometry and rendering processes, depending on the position and direction of the player's automobile which is controlled by the player's automobile control unit 255. When a collision signal is supplied from the position decision unit 259, the image display processor 256 displays a spinning or vibrating image on the display monitor 2.

Inasmuch as the position decision unit 259 determines the positional relation between the player's automobile and the general automobiles and the positional relation between the general automobiles, and also determines general automobiles which are positioned in the visible range of the player's automobile in the two-dimensional course coordinate system (x, y), the position decision unit 259 can easily and quickly determine those positional relations.

The general automobiles are controlled by the course coordinate system processor 252, and the positional coordinate data of only those general automobiles which are displayed on the display monitor 2 are transformed from the two-dimensional course coordinate system (x, y) into the three-dimensional world coordinate system (X, Y, Z). Therefore, the number of general automobiles that can be controlled can be increased without increasing the burden on the CPU of the controller 25. The increased number of general automobiles makes the driving game more interesting to the player, and also gives a more realistic look to three-dimensional images displayed on the display monitor 2.

A process of making a movement decision with the movement decision unit 258 will be described below with reference to FIG. 6.

It is assumed that an automobile which is under consideration for a movement decision has coordinates $(x_o, y_o)$ in the course coordinate system (x, y), an automobile k which is not under consideration for a movement decision have coordinates $(x_k, y_k)$ in the course coordinate system (x, y), and each lane of the straight road 120 has a width D, where k is an integer ranging from 1–n.

As shown in FIG. 6, the movement decision unit 259 determines whether or not the difference $x_k-x_o$ between the coordinates $x_k$, $x_o$ is equal to or smaller than the width D in a step S1. If the difference $x_k-x_o$ is equal to or smaller than the width D (YES in the step S1), then the movement decision unit 258 determines whether or not the coordinate $y_k$ are greater than the coordinate $y_o$ in a step S3. If the coordinate $y_k$ are greater than the coordinate $y_o$ (YES in the step S3), then the movement decision unit 258 decides that the automobile k is positioned in front of the automobile which is under consideration for a movement decision in a step S5.

If the difference $x_k-x_o$ is greater than the width D (NO in the step S1), then the automobile k is not positioned in the same lane as the automobile which is under consideration for a movement decision. If the coordinate $y_k$ are smaller than the coordinate $y_o$ (NO in the step S3), then the automobile k is not positioned in front of the automobile which is under consideration for a movement decision. In either case, the movement decision unit 258 decides that the automobile k is not positioned in front of the automobile which is under consideration for a movement decision in a step S7.

The above process is effected on other automobiles k (1–n) than the automobile which is under consideration for a movement decision, so that all automobiles positions in front of the automobile which is under consideration for a movement decision can be ascertained.

Heretofore, the above process of making a movement decision is the most complex, and contains the largest number of processing steps, of all processes that make up the computerized control of the driving game. For driving the player's automobile on the display monitor 2 under the above preset conditions, it is necessary to determine whether another automobile exists on the preset lane or not according to the above process of making a movement decision. If the positions of the automobiles were calculated using three-dimensional coordinate data and the positional relationship between the automobiles were determined and the above process of making a movement decision were carried out using the calculated positions for displaying a three-dimensional image, then the program of the driving game would be complex and contains a large number of processing steps.

However, according to the present invention, since the two-dimensional coordinate data in the course coordinate system are used by the movement decision unit 258, the above process of making a movement decision can be carried out easily as shown in FIG. 6. This allows many general automobiles, e.g., several tens of general automobiles, to be used in the driving game, making the driving game more fun to play than heretofore.

Operation of the driving game machine according to the present invention will be described below with reference to FIGS. 7 and 8.

Figure 7:
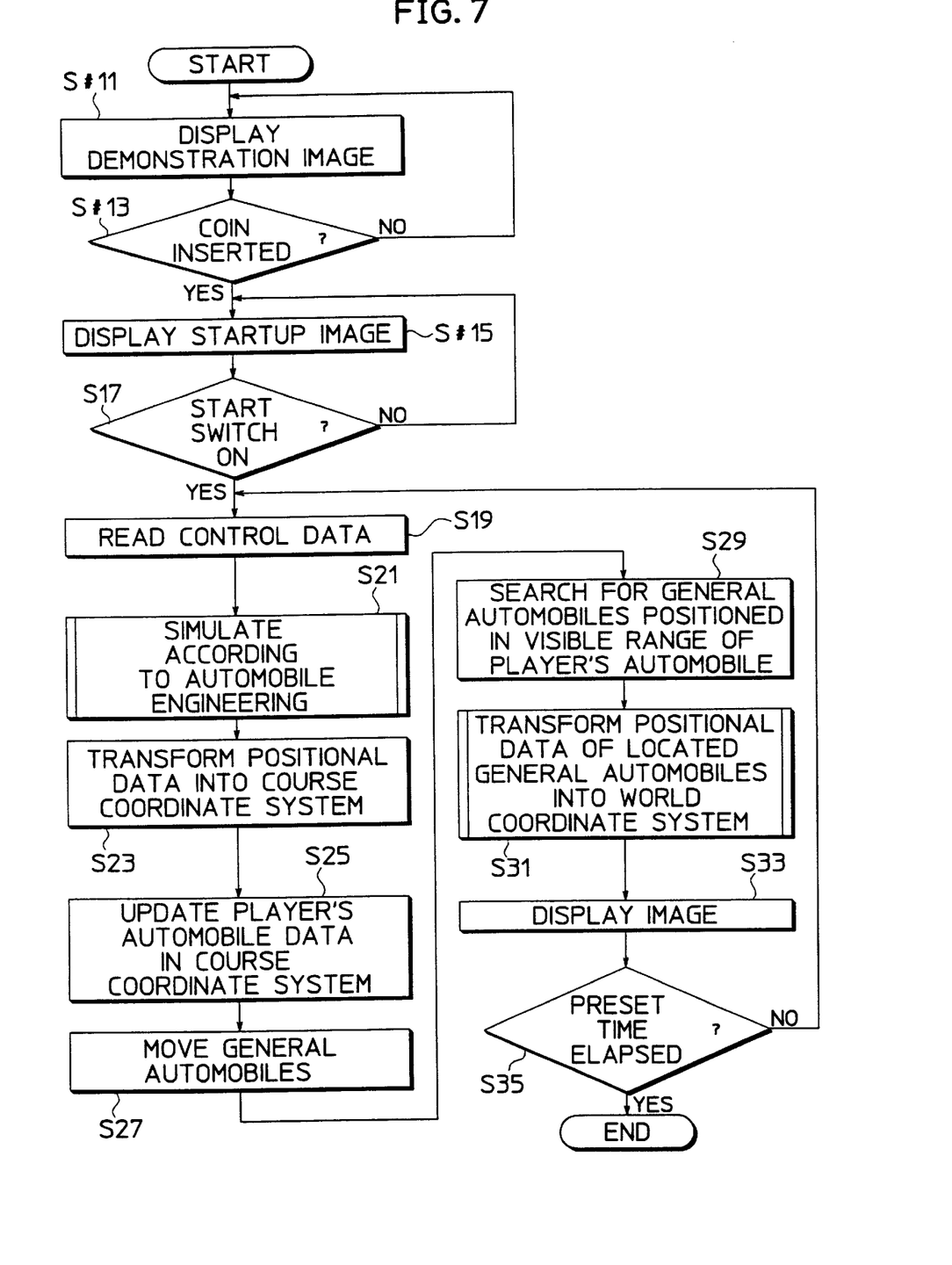
FIG. 7 is a flowchart of an operation sequence of the driving game machine.

As shown in FIG. 7, when the driving game machine is switched on, the image display processor 256 displays a demonstration image on the display monitor 2 in a step S11. Then, the controller 25 determines whether a coin is inserted into the coin insertion slot 8 or not in a step S13. If not inserted (NO in the step S13), then the image display processor 256 continuously displays the demonstration image on the display monitor 2. If inserted (YES in the step S13), then the image display processor 256 displays a startup image on the display monitor 2 in a step S15.

Then, the controller 25 determines whether the start switch 9 is pressed or not in a step S17. If not pressed (NO in the step 17), then the image display processor 256 continuously displays the startup image on the display monitor 2. If pressed (YES in the step S17), then the driving game is initiated, and the player operates the steering wheel 4, the accelerator pedal 5, the brake pedal 6, and the gear change lever 7 of the driving control assembly 22 to drive the player's automobile.

Various control data outputted from the driving control assembly 22 are supplied to the player's automobile control unit 255 in a step S19. The player's automobile control unit 255 effects a simulation process of simulating the player's automobile based on the automobile engineering according to the automobile behavior program stored in the ROM 23 in a step S21. Positional coordinate data of the player's automobile are produced by the player's automobile control unit 255 in the simulation process, and supplied to the course coordinate system transformation unit 253, which transforms the positional coordinate data into positional coordinate data in the course coordinate system (x, y) in a step S23.

Then, the positional data of the player's automobile in the position decision unit 259 are updated in a step S25. The general automobile control unit 257 effects a process of moving the general automobiles depending on the result determined by the movement decision unit 258 in a step S27.

Thereafter, the position decision unit 259 ascertains general automobiles that are positioned in the visible range of the player's automobile in a step S29. The world coordinate system transformation unit 254 transforms the positional coordinate data of the ascertained general automobiles from the course coordinate system (x, y) into the world coordinate system (X, Y, Z) according to a subroutine described later on in a step S31.

Then, the image display processor 256 effects a three-dimensional image process on the positional coordinate data of the general automobiles which have been converted into the world coordinate system (X, Y, Z) and also the data about the position and direction of the player's automobile which have been produced in the simulation process, and displays the player's automobile and the general automobiles on the display monitor 2 in a step S33. Then, the controller 25 determines whether a preset period of time has elapsed from the start of the driving game or not in a step S35. If not elapsed (NO in the step S35), then control returns to the step S19 to carry out the steps S19 through S35 to repeat the above running control process. If elapsed (YES in the step S35), then control comes to an end.

Figure 8:
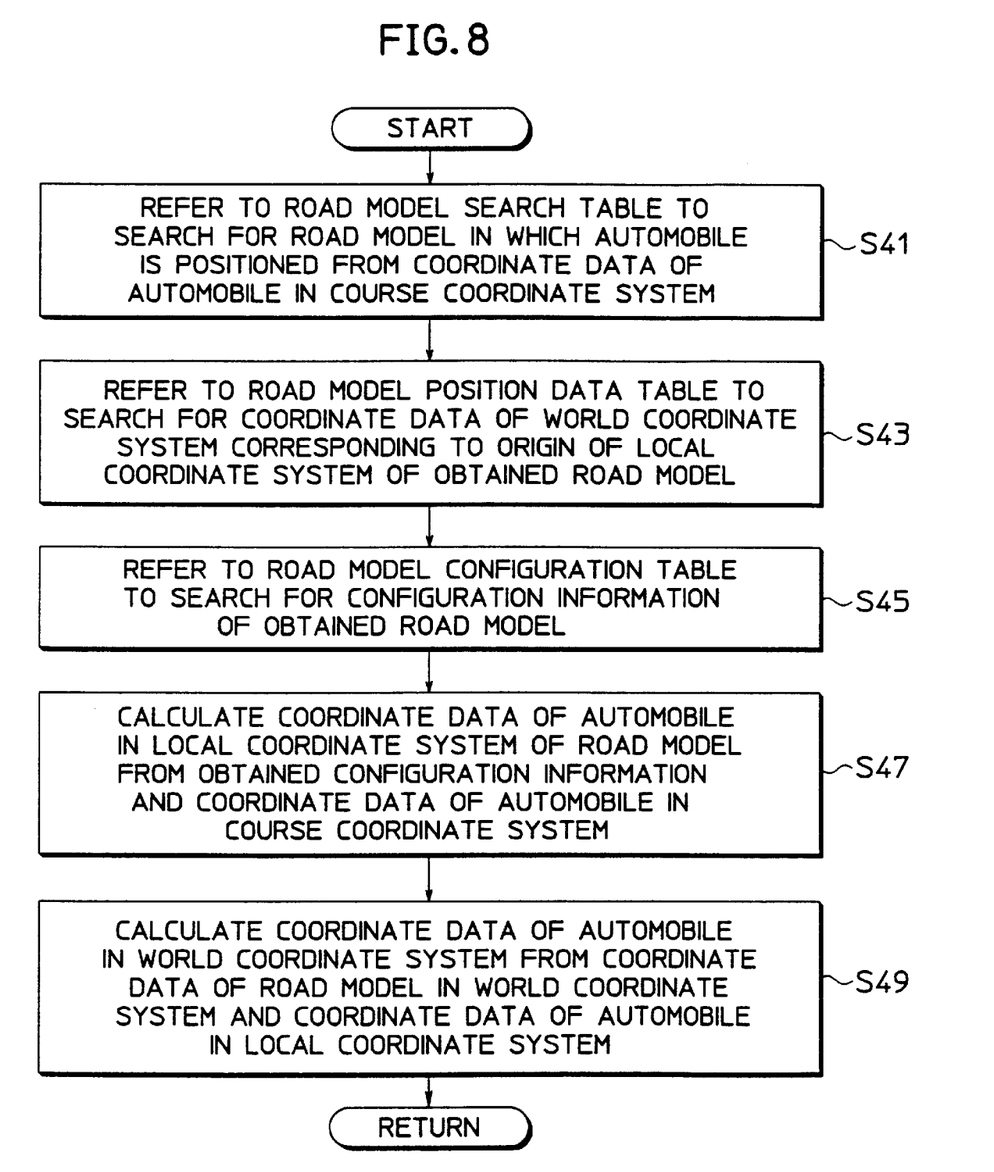
FIG. 8 is a flowchart of a conversion subroutine in the operation sequence shown in FIG. 7.

FIG. 8 shows the subroutine in the step S31 in greater detail. shown in FIG. 8, the position decision unit 259 refers to a road model search table 1, partly shown below, to search for a road model in which a general automobile is positioned, from the coordinate data of the general automobile in the course coordinate system (x, y) in a step S41.

| Road Model Search Table 1 | |
|---|---|
| Distance (m) | Road model |
| 0~100 | ① |
| 100~150 | ② |
| 150~200 | ③ |
| 200~230 | ④ |
| 230~400 | ⑤ |
| 400~500 | ⑥ |
| . | . |
| . | . |
| . | . |

The road model search table 1, which is partly shown above, is stored in the ROM 23, and represents the association between the distance-related groups of the y coordinates of the straight road 120 in the course coordinate system (x, y) and the road models of the straight road 120.

Thereafter, in a step S43, the position decision unit 259 refers to a road model position data table 2, partly shown below, to search for coordinate data in the world coordinate system (X, Y, Z) which correspond to the origin of the local coordinate system (x, y, z) that describes the road model obtained in the step S41.

| Road Model Position Data Table 2 | |
|---|---|
| Road Model | Position in world coordinate system |
| ① | $X_1, Y_1, Z_1$ |
| ② | $X_2, Y_2, Z_2$ |
| ③ | $X_3, Y_3, Z_3$ |
| ④ | $X_4, Y_4, Z_4$ |
| ⑤ | $X_5, Y_5, Z_5$ |
| ⑥ | $X_6, Y_6, Z_6$ |

The road model position data table 2, which is partly shown above, is stored in the ROM 23, and represents the positional relation between the local coordinate system (x, y, z) which describes the configuration information of each of the road models and the world coordinate system (X, Y, Z).

Then, in a step S45, the position decision unit 259 refers to a road model configuration table 3, partly shown below, to search for configuration information of the road model obtained in the step S41.

| Road Model Configuration Table 3 | | | | |
|---|---|---|---|---|
| | | Road Configuration Information | | |
| Road Model | Lanes | Shape | Center of Curvature | Radius of Curvature |
| ① | 4 | Straight | — | — |
| ② | 4 | Left Curve | $(x_2, y_2, z_2)$ | $r_2$ |
| ③ | 4 | Straight | — | — |
| ④ | 4 | Right Curve | $(x_4, y_4, z_4)$ | $r_4$ |
| ⑤ | 4 | Straight | — | — |
| ⑥ | 4 | Left curve | $(x_6, y_6, z_6)$ | $r_4$ |

The road model shape table 3, which is partly shown above, is stored in the ROM 23, and represents the information with respect to the configuration of each of the road models. The information with respect to the configuration of each of the road models includes the number of lanes, the shape, i.e., straight, left curve, or right curve, and additionally the center and radius of curvature for left and right curves in the local coordinate system (x, y, z).

Then, in a step S47, the position decision unit 259 calculates coordinate data of the automobile in the local coordinate system (x, y, z) of the road model from the coordinate data of the automobile in the course coordinate system (x, y) and the configuration information obtained in the stop S45.

Finally, in a step S49, the position decision unit 259 calculates coordinate data of the automobile in the world coordinate system (X, Y, Z) from the coordinate data of the road model in the world coordinate system (X, Y, Z), which have been obtained in the step S43, and the coordinate data of the automobile in the local coordinate system (x, y, z).

In the subroutine shown in FIG. 8 for the coordinate transformation from the course coordinate system (x, y), automobiles that run in inner lanes along a curve of the circuit board 12 may be somewhat decelerated, and automobiles turn run in outer lanes along a curve of the circuit board 12 may be somewhat accelerated for thereby compensating for automobile speed differences between the straight road 120 and the circuit road 12.

Figure 3:
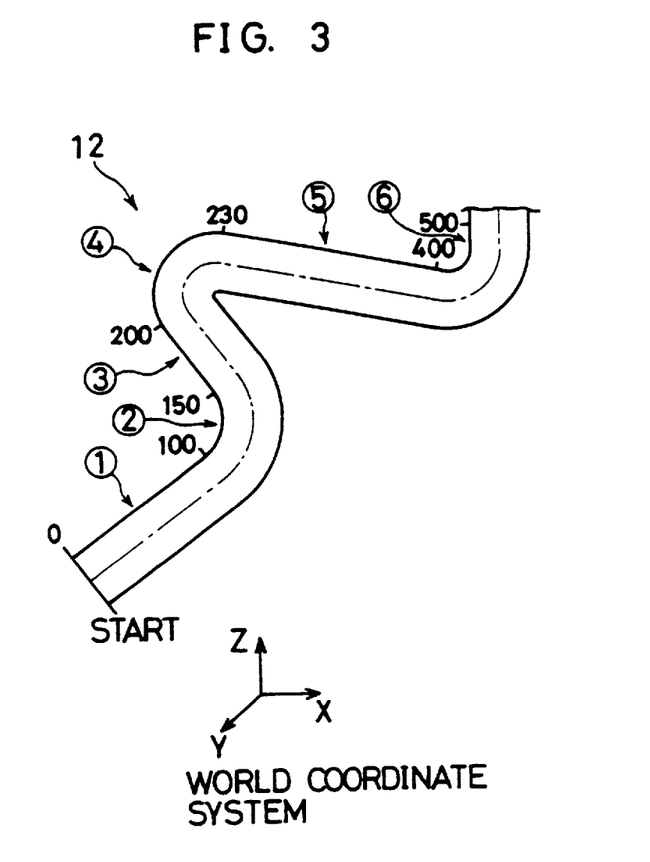
FIG. 3 is a diagram showing a portion of a circuit road which is divided into road models.

In FIG. 3, the circuit road 12 may be divided into road models of uniform length at constant distances or intervals. The road models of uniform length can easily be searched for in the step S41 shown in FIG. 8.

Two players can compete with each other in a driving game which is played using two driving game machines each identical to the driving game machine shown in FIG. 5.

The two driving game machines are connected to each other by a communication cable. To allow the two driving game machines to communicate with each other, the controller 25 of each of the driving game machines additionally has a communication control unit 26 which is indicated by the dot-and-dash lines in FIG. 5.

The communication control unit 26 in the controller 25 of one of the driving game machines transmits the coordinate data of the position of the player's automobile to the other driving game machine, and receives the player's automobile controlled by the other driving game machine, i.e., the coordinate data in the course coordinate system (x, y) of the rival automobile controlled by the other driving game machine, and sends the received coordinate data to the position decision unit 259.

The position decision unit 259 determines the positional relation between the player's automobile and the rival automobile and also the positional relation between the general automobiles and the rival automobile, and further determines the rival automobile which is positioned in the preset visible range of the player's automobile. When the position decision unit 259 determines a contact or collision between the player's automobile and the rival automobile, it delivers a collision signal to the image display processor 256.

The movement decision unit 258 determines whether the rival automobile exists in front of the same lane as the player's automobile or not. When the position decision unit 259 determines that the rival automobile is positioned in the visible range of the player's automobile, the world coordinate system transformation unit 254 transforms the positional coordinate data of the rival automobile from the course coordinate system (x, y) into the world coordinate system (X, Y, Z). The image display processor 256 displays the rival automobile whose positional coordinate data have been transformed into the world coordinate system (X, Y, Z) on the display monitor 2.

As described above, the communication control units 26 in the controllers 25 of the two driving game machines exchange the positional data of the player's automobiles controlled by the respective driving game machines. Therefore, the players of the two driving game machines can compete with each other in a driving game jointly played on the driving game machines, and will find the driving game much more interesting.

Because the positional data of the rival automobile are handled as the two-dimensional coordinate data in the course coordinate system (x, y), the position decision unit 259 can easily and quickly determine the positional relations and the rival automobile in the visible range of the player's automobile. If three or more driving game machines are interconnected through their respective communication control units 26, then the number of rival automobiles involved in a driving game played jointly on the driving game machines increases to the point where the players will be excited by the driving game as they compete with many other rival automobiles simultaneously all the way during the driving game.

The communication control unit 26 may transmit the positional coordinate data of the player's automobile in the world coordinate system (X, Y, Z) which have been obtained by the player's automobile control unit 255, and also receive the positional coordinate data of the player's automobile in the world coordinate system (X, Y, Z) which is controlled by another driving game machine. In such a modification, the course coordinate system transformation unit 253 transforms the received positional coordinate data into the course coordinate system (x, y), and then delivers the transformed positional coordinate data to the position decision unit 259.

According to another modification, the interconnected driving game machines may be dispensed with their own individual controllers 25, but may be controlled by a single controller 25 in a centralized control system that governs all the driving game machines. In this modified arrangement, the single controller 25 does not need any communication control unit 26, but has course coordinate system processors 252 associated respectively with the driving game machines. The single controller 25 also has the course coordinate system processor 252, the course coordinate system transformation unit 253, and the world coordinate system transformation unit 254 for carrying out the same decision and transformation processes as described above.

Although a certain preferred embodiment of the present invention has been shown and described in detail, it should be understood that various changes and modifications may be made therein without departing from the scope of the appended claims.

What is claimed is:

1. A driving game machine comprising:

three-dimensional data memory means for storing coordinate data of a three-dimensional road established in a game space in a three-dimensional coordinate system;

two-dimensional data memory means for storing coordinate data of a straight road established in a two-dimensional coordinate system in association with said three-dimensional road;

player's automobile control means for controlling a player's automobile on said three-dimensional road as instructed by a player;

general automobile control means for controlling general automobiles on said straight road;

two-dimensional coordinate transforming means for transforming coordinate data of said player's automobile on said three-dimensional road into coordinate data on said straight road in said two-dimensional coordinate system; and position deciding means for determining the positional relation between said player's automobile and said general automobiles based on the coordinate data on said straight road in said two-dimensional coordinate system.

2. A driving game machine according to claim 1, wherein said position deciding means comprises means for determining general automobiles which are positioned in a predetermined visible range of said player's automobile, further comprising:

three-dimensional coordinate transforming means for transforming coordinate data of said general automobiles which are determined as being positioned in said predetermined visible range into coordinate data on said three-dimensional road in said three-dimensional coordinate system; and image display processing means for displaying said player's automobile and said general automobiles whose coordinate data have been transformed into the coordinate data on said three-dimensional road in said three-dimensional coordinate system, on a display monitor according to three-dimensional image processing.

3. A driving game machine according to claim 1 or 2, further comprising rival automobile control means for controlling a rival automobile on said three-dimensional road as instructed by a competing player, wherein said two-dimensional coordinate transforming means further comprises means for transforming coordinate data of said rival automobile on said three-dimensional road into coordinate data on said straight road in said two-dimensional coordinate system, and said position deciding means comprises means for determining the positional relation between said player's automobile and said rival automobile based on the coordinate data on said straight road in said two-dimensional coordinate system.

4. A driving game machine comprising:

player's automobile control means for controlling a player's automobile on a three-dimensional road in a game space in a three-dimensional coordinate system as instructed by a player;

general automobile control means for controlling general automobiles on a straight road in a two-dimensional coordinate system, which is converted from said three-dimensional road;

two-dimensional coordinate transforming means for transforming coordinate data of said player's automobile on said three-dimensional road into coordinate data on said straight road in said two-dimensional coordinate system;

position deciding means for determining the positional relation between said player's automobile and said general automobiles based on the coordinate data on said straight road in said two-dimensional coordinate system, and determining general automobiles which are positioned in a predetermined visible range of said player's automobile;

three-dimensional coordinate transforming means for transforming coordinate data of said general automobiles which are determined as being positioned in said predetermined visible range into coordinate data on said three-dimensional road in said three-dimensional coordinate system; and image display processing means for displaying said player's automobile and said general automobiles whose coordinate data have been transformed into the coordinate data on said three-dimensional road in said image space in said three-dimensional coordinate system.

5. A driving game machine according to claim 4, further comprising rival automobile control means for controlling a rival automobile on said three-dimensional road as instructed by a competing player, wherein said two-dimensional coordinate transforming means further comprises means for transforming coordinate data of said rival automobile on said three-dimensional road into coordinate data on said straight road in said two-dimensional coordinate system, and said position deciding means comprises means for determining the positional relation between said player's automobile and said rival automobile based on the coordinate data on said straight road in said two-dimensional coordinate system.

* * * * *